United States Patent [19]

Allen et al.

[11] Patent Number: 5,275,423
[45] Date of Patent: * Jan. 4, 1994

[54] SPIRAL WOUND GASKET

[75] Inventors: Kurt Allen, Cleckheaton, England; Walter Stephan, Chatsworth, N.J.

[73] Assignee: Flexitallic Inc., Deer Park, Tex.

[*] Notice: The portion of the term of this patent subsequent to Nov. 10, 2009 has been disclaimed.

[21] Appl. No.: 939,321

[22] Filed: Sep. 10, 1992

Related U.S. Application Data

[63] Continuation-in-part of Ser. No. 768,386, Sep. 30, 1991, Pat. No. 5,161,807.

[51] Int. Cl.$^5$ .............................................. F16J 15/12
[52] U.S. Cl. .................................. 277/180; 277/204; 277/233; 277/235 R
[58] Field of Search ............ 277/180, 204, 233, 235 R

[56] References Cited

U.S. PATENT DOCUMENTS

| | | |
|---|---|---|
| 2,196,953 | 4/1940 | Bohmer, Jr. et al. |
| 2,200,212 | 5/1940 | Bohmer, Jr. et al. |
| 2,339,479 | 1/1944 | McCreary |
| 3,815,927 | 6/1974 | Geipel ........................... 277/204 X |
| 4,673,187 | 6/1987 | Hanson et al. ................. 277/204 X |
| 5,161,807 | 11/1992 | Allen et al. .................... 277/204 X |

FOREIGN PATENT DOCUMENTS

| | | |
|---|---|---|
| 0391069 | 10/1990 | European Pat. Off. |
| 1026714 | 5/1966 | United Kingdom |
| 1213243 | 11/1970 | United Kingdom |
| 1298987 | 12/1972 | United Kingdom |
| 2121487 | 12/1982 | United Kingdom |
| 2141187 | 6/1987 | United Kingdom |
| 2202183 | 9/1988 | United Kingdom |

OTHER PUBLICATIONS

Brochure of Flexitallic Gasket Company Inc. ©1979 Flexitallic Spiral-Wound Gaskets with Flexicarb TM Filler.

British Standard Specification relating to materials, dimensions, markings and packaging of spiral wound gaskets, BS3381:1989.

*Primary Examiner*—William A. Cuchlinski, Jr.
*Assistant Examiner*—James K. Folker
*Attorney, Agent, or Firm*—Synnestvedt & Lechner

[57] ABSTRACT

A spiral wound gasket comprises an annulus constituted by a plurality of superposed turns of a profiled metal strip wound upon itself to form a spiral and, interposed between at least some of said superposed turns, a number of turns of a relatively soft sealant material in strip form, the width of said metal strip being selected so that prior to use the wound metal spiral is essentially flush with the surface of an associated guide ring and the width of the strip of relatively soft sealant material being selected so that prior to use, it projects a significant distance on both sides of the gasket from said superposed metal turns axially of said annulus. The preferred relatively soft sealant material is exfoliated graphite foil or a fluorocarbon resin, unsintered PTFE being particularly preferred. The sealant material preferably projects from the metal spiral to define an overall gasket thickness on the order of 25 to 40 percent greater than that of the guide ring.

10 Claims, 2 Drawing Sheets

SPIRAL WOUND GASKET

This application is a continuation in part of application Ser. No. 07/768,386 filed Sep. 30th, 1991 now U.S. Pat. No. 5,161,807.

FIELD OF THE INVENTION

This invention relates to spiral wound gaskets. A spiral wound gasket is known from, inter alia, GB-A-1026714 and GB-A-1213243. It is constituted by an annulus comprising a narrow strip of a resilient metal wound upon itself to form a spiral, a correspondingly narrow strip of a relatively soft sealant material such as a gasket paper being interleaved between at least the middle turns. The metal strip is usually profiled longitudinally into a shallow 'V' or 'W' section so as to confer a degree of controlled axial compressibility onto the assembled spiral. The assembled spiral wound gasket is normally used in conjunction with at least an outer guide ring in the form of a metal annulus which is thinner than the uncompressed spiral. This guide ring serves to limit axial compression of the spiral, when in use, to a safe level whereby the elastic limit of the metal is not exceeded.

The sealing action of a conventional spiral wound gasket is thus two-fold. Firstly, the edges of the metal strip engage and bite into the confronting flanges between which the spiral is installed. Secondly, the interleaved soft sealant material is compressed and provides a back-up seal. But both aspects rely on the fact that the metal spiral projects a significant amount above the height of the associated guide ring and that the spiral is axially compressed down to the thickness of the guide ring, by the application of very considerable force.

SUMMARY AND OBJECT OF THE INVENTION

It is an object of the present invention to provide an improved spiral wound gasket which does not rely on the two-fold sealing action just described.

According to the present invention, a spiral wound gasket comprises an annulus constituted by a plurality of superposed turns of a metal strip wound upon itself to form a spiral and, interposed between at least some of said superposed turns, a number of turns of a relatively soft sealant material in strip form, together with stop means comprised of a guide ring which limits axial compression of said gasket the width of said metal strip being selected so that prior to use the thickness of the wound metal spiral is approximately equal to the thickness of the associated guide ring and the width of the strip of the relatively soft sealant material being selected so that prior to use it projects on both sides of the gasket a significant distance from said superposed metal turns axially of said annulus. In the present context, "essentially flush" means that the metal strip/spiral does not project more than about 0.2mm from the face of a typical guide ring when installed therein.

"Significant amount" means at least 1mm, and up to as much as 2mm relative to the face of the guide ring. The relatively soft sealant material is preferably a fluorocarbon resin such as PTFE, or exfoliated graphite. Both of these are good gasket materials and exfoliated graphite in particular has excellent conformability, heat resistance and elastic recovery. Such materials are conveniently available in the form of sheet or foil which can readily be slit into strips for interleaving between the metal turns. Where a fluorocarbon resin is employed, it is preferably in an unsintered form, unsintered PTFE being particularly preferred.

It will be appreciated that the underlying philosophy of the spiral wound gasket of this invention is completely at variance with that of a conventional spiral wound gasket, because axial compression of the metal part of the spiral no longer plays a significant part. The superposed metal turns serve primarily as a support for the relatively soft sealant material which projects from the face of the spiral. In fact, it is the sealant material which when compressed develops the primary seal across the face of the gasket. This is to be contrasted with the traditional spiral wound gasket which relies on the metal windings as the primary seal. The spiral turns of steel must project above the guide ring by a significant amount for this to work, but very high forces must be applied to achieve the minimum sealing stress needed. These forces are typically of the order of from 10,000 to 25,000 psi. By contrast, the gaskets of this invention when based on the same steel plus unsintered fluorocarbon resin such as PTFE or exfoliated/expanded graphite can seal at loadings of less than 5,000 psi, because it is no longer necessary to significantly compress the steel component.

BRIEF DESCRIPTION OF THE DRAWINGS

In order that the invention be better understood, embodiments of it will now be described by way of example with reference to the accompanying drawings in which.

DESCRIPTION OF PREFERRED EMBODIMENTS

Figures 1, 2:
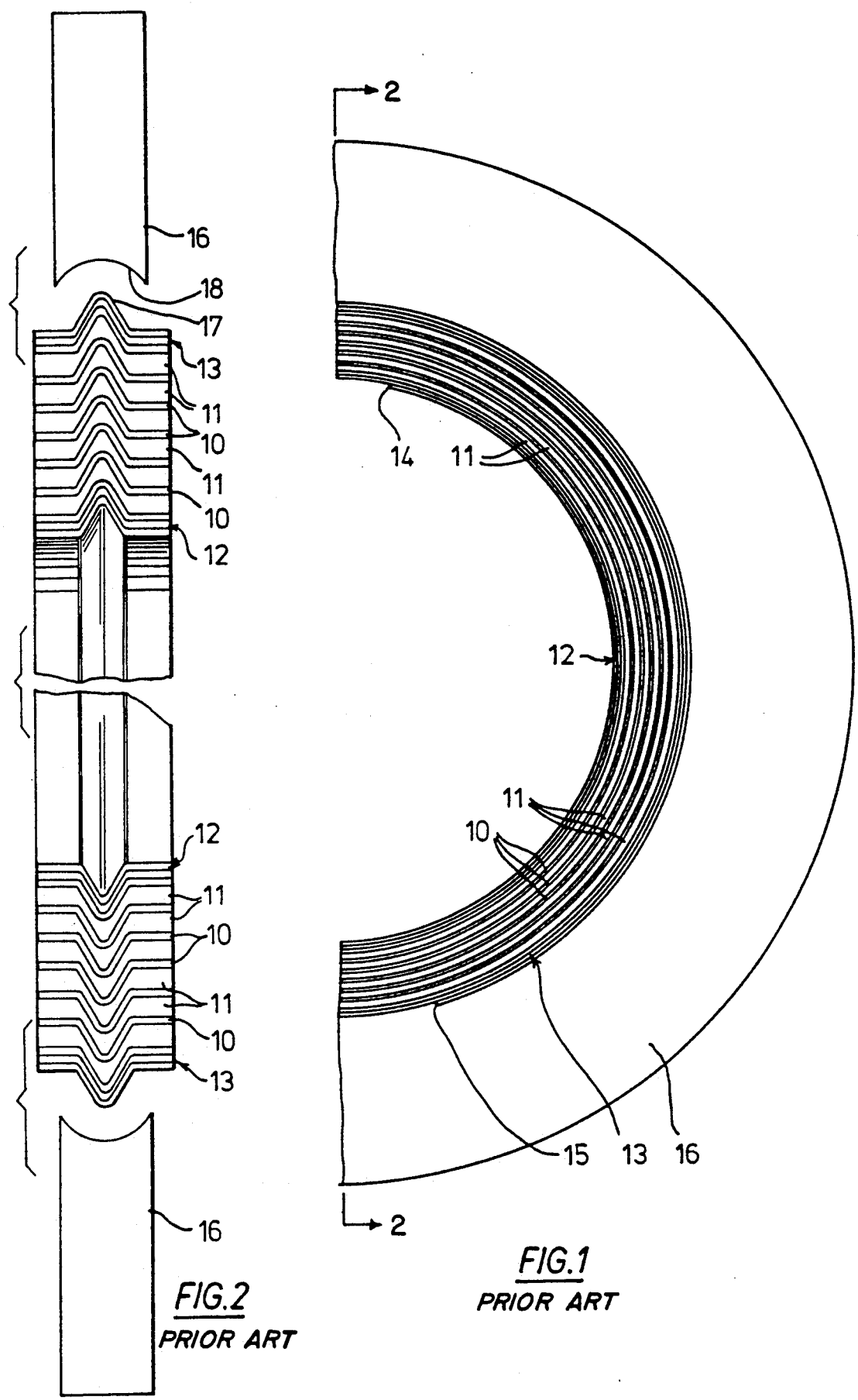
FIGS. 1 and 2 illustrate the construction of a conventional spiral wound gasket.

Referring firstly to FIGS. 1 and 2, FIG. 1 is a plan view of approximately half of a spiral wound gasket complete with half of its associated guide ring. FIG. 2 is a cross-sectional view taken on line 2—2 of FIG. 1. It is shown slightly enlarged for purposes of illustration. In the Figures, the gasket comprises a plurality of turns of a generally "V" cross-section metal strip. The innermost turns 12 and the outermost turns 13 are free from gasket material. The inner free end 14 is secured by spot welding to the adjacent underlying turn; the outer free end 15 is likewise secured to the adjacent underlying turn, also by spot welding. A plurality of turns 11 of a relatively soft gasket material 11, typically a gasket paper, are interleaved with the intermediate metal turns 10 during winding, as best seen in FIG. 2. The overall spiral structure is thus a laminate sandwiched between plain metal turns.

The radially outer rim of the spiral has a nose region 17 defined by the apex of the "V" cross-section. This enables it to be snapped into an outer guide ring 16, the inner edge of which is provided with a machined or pressed groove 18 to receive it. In use, the guide ring 16 is used to center the complete gasket within the bolt circle of a flanged pipe joint, in the usual way, (not shown). The bolts are tightened so that the opposed flanges apply pressure to the front and rear faces of the spiral wound annulus. This is then progressively compressed through deformation of the "V" shaped cross-section until the pipe flanges seat onto the faces of the guide ring 16. The loading required to achieve this in a typical, conventional gasket is very high, as is discussed elsewhere in this specification.

Figure 4:
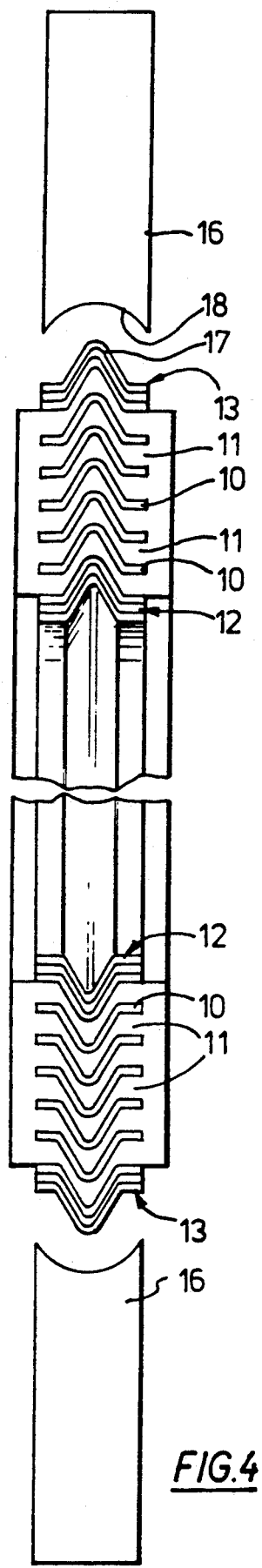
Figures 3 and 4 illustrate the construction of a spiral wound gasket according to the present invention.
Figure 3:
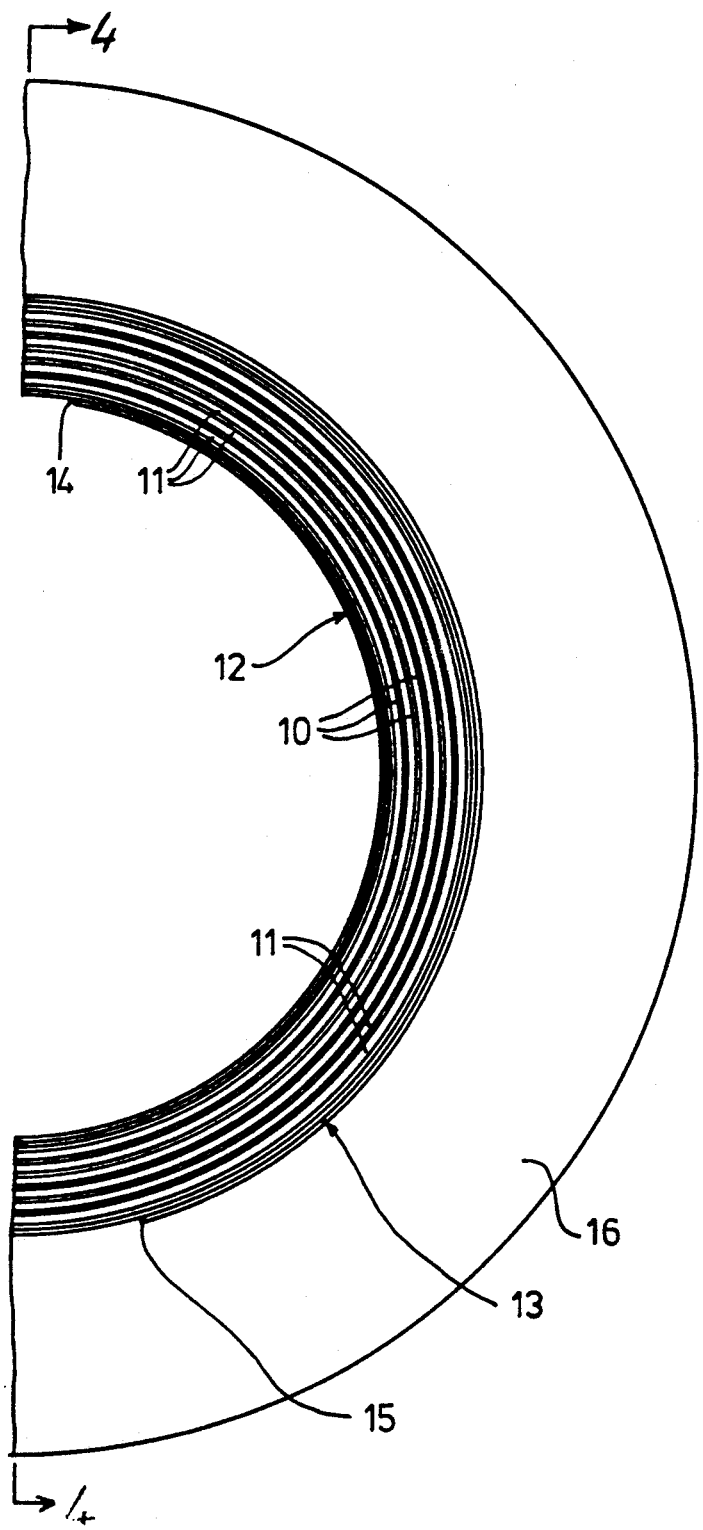

Referring now to FIGS. 3 and 4 which illustrate the gaskets of this invention, the construction is superficially similar, Figure 3 being a plan view similar to FIG. 1 and FIG. 4 being a cross-sectional view taken on line 4—4 of FIG. 3. However, the width of the spiral wound metal strip is considerably reduced, until in its uncompressed state it is not significantly thicker than the guide ring 16. The relatively soft sealant material 11 is made much wider, so that it projects a significant distance from the metal component turns, 10.

As previously indicated, the relatively soft sealant material 11 may be either a fluorocarbon resin, preferably unsintered PTFE, or it may be an exfoliated graphite foil. However because PTFE is less compressible than graphite, the inner radius of the metal spiral may need to be reinforced by the inclusion of extra turns of metal strip. Typically two or three extra turns (without sealant material) will be sufficient to confer adequate resistance to any added radially inwardly directed compressive force resulting from the use of PTFE as opposed to graphite.

In use, the behaviour of this structure is very different, because there is no significant compression of the metal strip. On bolt-up in a flanged pipe joint, the relatively soft sealant material is completely free to deform/conform to the surface configuration on the confronting flange surfaces without the intervention of the metal part of the spiral. The underlying metal spiral provides a resilient support zone for the gasket material, but because it does not have to be compressed down to the guide ring thickness as was the case with FIGS. 1 and 2, very much lower forces are required to achieve a seal; this is as little as half the bolt loading previously required.

To further illustrate the invention, practical embodiments will now be described with reference to one specific gasket, namely for a bolted flanged joint between two pipes of nominal bore 4 inches and a pressure rating of 150 psi. For this very common application, a conventional spiral wound gasket of the FIG. 1 type (prior art) would have the parameters given in column 1 below.

For the purposes of this illustration exfoliated graphite foil was used as the relatively soft sealant material.

|  | FIG. 1 | FIG. 3 |
|---|---|---|
| Guide ring thickness | 3.2 mm | 3.2 mm |
| Uncompressed spiral thickness | 4.5 mm | 4.5 mm |
| Exfoliated graphite height above metal windings | 0.2 mm | 1.27 mm |

(The FIGURES are nominal values typical of production gaskets.)

The second column of FIGURES is for a spiral wound gasket according to the invention and as shown in FIG. 3. Whilst the differences may appear minimal, it should be noted that the exfoliated graphite height above the metal windings is very significant. The FIG. 1 gasket required a bolt loading in excess of 10,000 psi to achieve a seal. By contrast, the Figure 2 gasket sealed at 5,000 psi or less. From a practical point of view, this is a very significant difference; it is much easier to achieve and at much lower individual bolt loading.

The metal winding thickness in the example of FIG. 3 can be determined from the above data to be about 9.4% greater than the thickness of the guide ring, which is in a range of not greater than 15%. The total gasket thickness is about 40.6% greater than the thickness of the guide ring, which is at the upper end of a range of on the order of 25 to 40%.

Similar results were obtained using unsintered PTFE as the relatively soft sealant material, although because of the reduced compressibility of PTFE, it proved necessary to add two extra sealant-free turns to the metal winding at its radially inner end in order to minimize the risk of radially inwardly collapse on bolt up in a test flange.

It should be understood that "sealed" in the context of a gasket is a relative term, since in practical gaskets, some very minor leakage is acceptable. Judged on this basis, using pressurised gas as a test medium, the gasket of FIG. 3 with PTFE or exfoliated graphite as a sealant material exhibited a significantly lower leakage rate than the conventional gasket of FIG. 1, when tested under directly comparable conditions. The good sealing performance of the FIG. 3 gasket was retained even after thermal cycling tests, under which the FIG. 1 gasket might have been expected to show some advantage because of the primary sealing role of the metal windings.

We claim:

1. A spiral wound gasket comprising an annulus constituted by a plurality of superposed turns of a profiled metal strip wound upon itself to form a spiral and, interposed between at least some of said superposed turns, a number of turns of a relatively soft fluorocarbon resin sealant material in strip form, together with stop means comprised of a guide ring which limits axial compression of said gasket, the thickness of said metal strip being selected so that prior to use the thickness of the wound metal spiral is approximately equal to the thickness of the associated guide ring, the thickness of the strip of relatively soft sealant material being selected so that prior to use, it projects a significant distance on both sides of the gasket from said superposed metal turns axially of said annulus.

2. A spiral wound gasket according to claim 1 wherein the total thickness of the spiral wound metal annulus in an uncompressed state is not more than about 15 percent greater than the thickness of the guide ring.

3. A spiral wound gasket according to claim 1 or claim 2 wherein the turns of relatively soft fluorocarbon resin sealant material project from the metal annulus with their distal edges defining a total gasket thickness in the uncompressed state which is from 25 to 40 percent greater than that of the guide ring.

4. A spiral wound gasket according to claim 3 wherein the relatively soft fluorocarbon resin sealant material component of the gasket is in the uncompressed state from 30 to 40 percent greater in thickness than the guide ring.

5. A spiral wound gasket according to claim 1 wherein the relatively soft fluorocarbon resin sealant material is unsintered PTFE.

6. In a spiral wound gasket comprising a flat metal guide ring defining an aperture into which is received an axially compressible spiral wound metal annulus constituted by a plurality of superposed turns of a profiled metal strip wound upon itself to form a spiral and having interposed between at least some of said turns, a number of turns of a relatively soft fluorocarbon resin sealant material in strip form, the improvement wherein said axially compressible spiral wound metal annulus has an uncompressed thickness not significantly greater than that of the guide ring and said relatively soft sealant material prior to use projects a significant distance on both sides of the gasket from said metal annulus.

7. The gasket of claim 6 wherein said axially compressible metal annulus exhibits a thickness in an uncompressed state not more than about 15 percent greater than the thickness of the guide ring.

8. The gasket of claim 7 wherein the turns of relatively soft fluorocarbon resin sealant material project from the spiral wound metal annulus with their distal edges defining a total gasket thickness in the uncompressed state which is from 25 to 40 percent greater than that of the guide ring.

9. The gasket of claim 8 wherein the relatively soft fluorocarbon resin material projects from the spiral wound metal annulus to define a total gasket thickness in the order of 30 to 40 percent greater than the thickness of the guide ring.

10. The gasket of claim 6 wherein said relatively soft fluorocarbon resin sealant material is an unsintered PTFE foil.

* * * * *